(12) United States Patent
Vogt et al.

(10) Patent No.: US 8,560,316 B2
(45) Date of Patent: Oct. 15, 2013

(54) CONFIDENCE LEVELS FOR SPEAKER RECOGNITION

(76) Inventors: Robert Vogt, Brisbane (AU); Michael Mason, Chapel Hill (AU); Sridaran Subramanian, Annerley (AU)

( * ) Notice: Subject to any disclaimer, the term of this patent is extended or adjusted under 35 U.S.C. 154(b) by 735 days.

(21) Appl. No.: 12/667,163

(22) PCT Filed: Dec. 19, 2007

(86) PCT No.: PCT/AU2007/001963
§ 371 (c)(1),
(2), (4) Date: Dec. 29, 2009

(87) PCT Pub. No.: WO2008/074076
PCT Pub. Date: Jun. 26, 2008

(65) Prior Publication Data
US 2010/0204993 A1    Aug. 12, 2010

(30) Foreign Application Priority Data

Dec. 19, 2006    (AU) ................................ 2006907080

(51) Int. Cl.
*G10L 15/00*    (2013.01)
(52) U.S. Cl.
USPC .......................................... 704/246; 704/234
(58) Field of Classification Search
USPC .................................. 704/246, 234
See application file for complete search history.

(56) References Cited

U.S. PATENT DOCUMENTS

| 5,675,704 | A | * | 10/1997 | Juang et al. | 704/246 |
| 6,073,101 | A | * | 6/2000 | Maes | 704/275 |
| 6,879,968 | B1 | | 4/2005 | Hayakawa et al. | |
| 7,409,343 | B2 | * | 8/2008 | Charlet | 704/246 |
| 2004/0107099 | A1 | * | 6/2004 | Charlet | 704/234 |
| 2006/0253284 | A1 | | 11/2006 | Mami et al. | |
| 2009/0048847 | A1 | * | 2/2009 | Jung et al. | 704/500 |

FOREIGN PATENT DOCUMENTS

EP    1184840 A1    3/2002

OTHER PUBLICATIONS

International Search Report and Written Opinion under date of mailing of Apr. 3, 2009 in connection with PCT/AU07/001963.
International Preliminary Report on Patentability under date of mailing of Jun. 24, 2009 in connection with PCT/AU07/001963.
Liu et al., "Improved GMM-UBM/SVM for Speaker Verification", 2006 IEEE International Conference on Acoustics, Speech and Signal Processing, 2006, ICASSP 2006 Proceedings, vol. 1, pp. I-925 to I-928, Publication Date: May 14-19, 2006.

* cited by examiner

*Primary Examiner* — Daniel D Abebe
(74) *Attorney, Agent, or Firm* — Quarles & Brady LLP

(57) ABSTRACT

The present invention relates to a system and method of making a verification decision within a speaker recognition system. A speech sample is gathered from a speaker over a period of time a verification score is then produce for said sample over the period. Once the verification score is determined a confidence measure is produced based on frame score observations from said sample over the period and a confidence measure calculated based on the standard Gaussian distribution. If the confidence measure indicates with a set level of confidence that the verification score is below the verification threshold the speaker is rejected and gathering process terminated.

48 Claims, 11 Drawing Sheets

CONFIDENCE LEVELS FOR SPEAKER RECOGNITION

CROSS-REFERENCE TO RELATED APPLICATIONS

This application claims priority to PCT International Application No. PCT/AU2007/001963 filed Dec. 19, 2007, which claims priority to Australian Application No. 2006907080 filed on Dec. 19, 2006, incorporated by reference herein.

BACKGROUND OF THE INVENTION

1. Field of the Invention

The present invention relates generally to a system and method for speaker recognition. In particular, although not exclusively, the present invention relates to the use of uncertainty modelling in automatic speaker verification systems.

2. Discussion of the Background Art

In recent years, the interaction between computing systems and humans has been greatly enhanced by the use of speech recognition software. However, the introduction of speech based interfaces has presented the need for identifying and authenticating speakers to improve reliability and provide additional security for speech based and related applications. Various forms of speaker recognition systems have been utilised in such areas as banking and finance, electronic signatures and forensic science.

The problem with most speaker verification systems is that they do not provide a speaker recognition algorithm which performs reliably under adverse communications conditions, such as limited enrolment speech, channel mismatch, speech degradation and additive noise, which typically occur over telephony networks.

One major development this field which resulted significant improvements in the reliability of such speaker verification systems was the introduction of the universal background model (UBM). The UBM generally serves two distinctly different roles in a typical speaker verification system. Firstly, as the name suggests, as a background model representing all other speakers other than the claimant during a verification trial. Secondly, and more importantly, the UBM provides the information used to determine the prior distribution of speaker model parameters for MAP adaptation training. A speaker verification system which employs a UBM is discussed in the applicant's earlier filed International Application WO2005/055200 entitled "Model Adaptation System and Method for Speaker Recognition" the contents of which are herein incorporated by reference.

Since development of the system and method discussed in WO2005/055200 the applicant has realised that further improvements to the reliability of such speaker verification systems can be realised

SUMMARY OF THE INVENTION

Disclosure of the Invention

Accordingly in one aspect of the invention there is provided a method for determining the confidence with which a verification score lies above or below a specified verification threshold said method including the steps of:
gathering a speech sample from a speaker over a period of time;
estimating a verification score for said sample over the period;
determining confidence measures for accept and reject decisions for the verification score at the specified verification threshold the step of determining further including the steps of:
estimating the probability density distribution of the estimated verification score;
calculating the confidence of an accept decision as the proportion of the estimated probability density that is above the specified verification threshold; and
calculating the confidence of a reject decision as the proportion of the estimated probability density that is below the specified verification threshold.

In another aspect of the present invention there is provided a system for determining the confidence with which a verification score lies above or below a specified verification threshold said system including:
an input for gathering a speech sample from a speaker over a period of time;
at least one processor wherein said at least one processor is configured to:
estimate a verification score for said sample over the period;
determine confidence measures for accept and reject decisions for the verification score at the specified verification threshold the step of determining further including the steps of:
estimating the probability density distribution of the estimated verification score;
calculating the confidence of an accept decision as the proportion of the estimated probability density that is above the specified verification threshold; and
calculating the confidence of a reject decision as the proportion of the estimated probability density that is below the specified verification threshold.

In a further aspect of the present invention there is provided a method for providing an accept or reject verification decision within a speaker recognition system with a minimal duration sample of speech with a predetermined confidence level said method including the steps of:
gathering a short speech sample from a speaker over a period of time;
estimating a verification score for said sample over the period;
determining confidence measures accept and reject decisions for said verification score at a specified verification threshold whereby the step of determining further includes the steps of:
estimating the probability density distribution of the estimated verification score;
calculating the confidence of an accept verification decision as the proportion of the estimated probability density that is above the specified verification threshold;
making an accept decision if the calculated confidence of an accept decision equals or exceeds the specified confidence level and terminating any further gathering of speech samples;
calculating the confidence of a reject verification decision as the proportion of the estimated probability density that is below the specified verification threshold and;
making a reject decision if the calculated confidence of an reject decision equals or exceeds the specified confidence level and terminating any further gathering of speech samples;
repeating the previous steps until a verification decision has been reached where the speech samples are accumulated to improve the accuracy and quality of the estimated probability density distribution of the verification score.

In a further aspect of the present invention there is provided a speaker recognition system for providing an accept or reject verification decision within a speaker recognition system with a minimal duration sample of speech with a predetermined confidence level said system including:
- an input for gathering a speech sample from a speaker over a period of time;
- at least one processor wherein said at least one processor is configured to:
  - estimating a verification score for said sample over the period;
  - determining confidence measures accept and reject decisions for said verification score at a specified verification threshold whereby the step of determining further includes the steps of:
    - estimating the probability density distribution of the estimated verification score;
    - calculating the confidence of an accept verification decision as the proportion of the estimated probability density that is above the specified verification threshold;
    - making an accept decision if the calculated confidence of an accept decision equals or exceeds the specified confidence level and terminating any further gathering of speech samples;
    - calculating the confidence of a reject verification decision as the proportion of the estimated probability density that is below the specified verification threshold and;
    - making a reject decision if the calculated confidence of an reject decision equals or exceeds the specified confidence level and terminating any further gathering of speech samples;
  - repeating the previous steps until a verification decision has been reached where the speech samples are accumulated to improve the accuracy and quality of the estimated probability density distribution of the verification score.

In yet another aspect of the present invention there is provided a method of providing an accept or reject verification decision within a speaker recognition system having a minimal duration sample of speech with a predetermined verification threshold said method including the steps of:
- gathering a sample speech from a speaker over a period of time;
- producing a verification score for said sample over the period;
- determining whether the verification score is above or below the verification threshold wherein the step of determining includes the steps of:
  - determining confidence measures for said verification score;
  - estimating the probability density distribution of the estimated verification score; and
    - rejecting said speaker and terminating the gathering of said speech sample upon the confidence measure indicating with a set level of confidence at a time t that the verification score is below the verification threshold,
    - or accepting said speaker and terminating the gathering of said speech sample upon the confidence measure indicating with a set level of confidence at a time t that the verification score is above the verification threshold.

In a further aspect of the present invention there is provided a speaker verification system for providing an accept or reject verification decision within a speaker recognition system with a minimal duration sample of speech with a predetermined verification threshold said system including:
- an input for gathering a speech sample from a speaker over a period of time;
- at least one processor wherein said at least one processor is configured to:
  - produce a verification score for said sample over the period of time;
  - determine whether the verification score is above or below the verification threshold wherein determining whether the verification score is above or below the verification threshold includes:
    - determining confidence measures for said verification score;
    - estimating the probability density distribution of the estimated verification score; and
      - reject said speaker and terminate the gathering of said speech sample upon the confidence measure indicating with a set level of confidence that the verification score is below the verification threshold,
      - or accept said speaker and terminate the gathering of said speech sample upon the confidence measure indicating with a set level of confidence that the verification score is above the verification threshold.

Preferably the speaker verification system utilises a fully coupled GMM-UBM modelling using MAP adaptation. In the case where the speaker verification system utilises a fully coupled GMM-UBM modelling using iterative MAP adaptation the verification score is taken as the Expected Log-Likelihood Ratio (ELLR) of the speaker to the UBM wherein the expectation is taken over $$\Lambda_s = \frac{1}{T}\sum_{t=1}^{T} l_s(t)$$

$$= \frac{1}{T}\sum_{t=1}^{T} \log\left(\frac{p(x_t|\lambda_s)}{p(x_t|\lambda_{ubm})}\right) \text{ where}$$

$$p(x|\lambda) = \sum_{c=1}^{C} \omega_c g(x|\mu_c, \Sigma_c)$$

and where $\omega_c$ is the mixing factor and $g(x|\mu_c, \Sigma_c)$ denotes the multivariate Gaussian density with mean $\mu_c$ and variance matrix $\Sigma_c$ for mixture component c.

Suitably the probability density distribution is calculated based on the frame log-likelihood ratios $l_s(t)$ having a mean $m_l$ and variance $s_l^2$ wherein the probability density distribution for the verification score is approximated by a Gaussian distribution with a variance of $$\sigma_s^2 = \frac{s_l^2}{T-1}$$

with a mean of $\mu_s = m_l$.

Alternatively the probability density distribution may be calculated using a transformation approach wherein the Expected Log-Likelihood Ratios (ELLR) estimates are given by $$y_s(i) = \frac{1}{N} \sum_{t=N_i}^{N(i+1)-1} l_s(t)$$

where N is the length of the short frame sequences wherein the probability density distribution for the verification score has a variance of $$\sigma_s^2 = \frac{s_y^2}{T/N - 1}$$

with a mean of $\mu_s = m_y$.

To provide a more robust determination of the confidence interval a priori information may be included. In such a case the probability density distribution is given by $$\hat{s}^2 = \frac{\tau \kappa^2 + (M-1)s^2}{\tau + (M-1)}$$

where $s^2$ is unbiased sample variance from M samples and $\kappa^2$ and $\tau$ are hyperparameters of the prior distribution, which takes the form of a Dirichlet distribution.

Score normalisation maybe applied to the raw scores used to produce the verification score. The normalisation may employ a simply linear transform such as the Z-Norm where the Z-Norm statistics are given by $\mu_Z$ and $\sigma_Z$ and the normalised ELLR is given by:

$$\Lambda_z(s) = \frac{\Lambda(s) - \mu_z(s)}{\sigma_z(s)}$$
$$= a\Lambda(s) + b$$

where $a = 1/\sigma_Z(s)$ and $b = -\mu_Z(s)/\sigma_Z(s)$. Alternatively the z-Norm may be directly applied to the individual frame scores, as given by:

$$\Lambda_z(s) = \frac{1}{T} \sum_{t=1}^{T} l'_s(t);$$
$$l'_s(t) = al_s(t) + b$$

wherein the probability density distribution for the verification has a variance of:

$$\sigma_{s|z}^2 = a^2 \sigma_s^2$$
$$= \frac{a^2 s_l^2}{T-1}$$

with a mean of:

$$\mu_{s|z} = a\mu_s + b$$
$$= am_l + b$$

The predetermined level of confidence for the determination of verification decision (accept or reject) may be set between a confidence range of 50% to less than 100%. It will be appreciated that the level of confidence will vary depending on the system operating requirements and the deployment environment.

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

Figure 1:
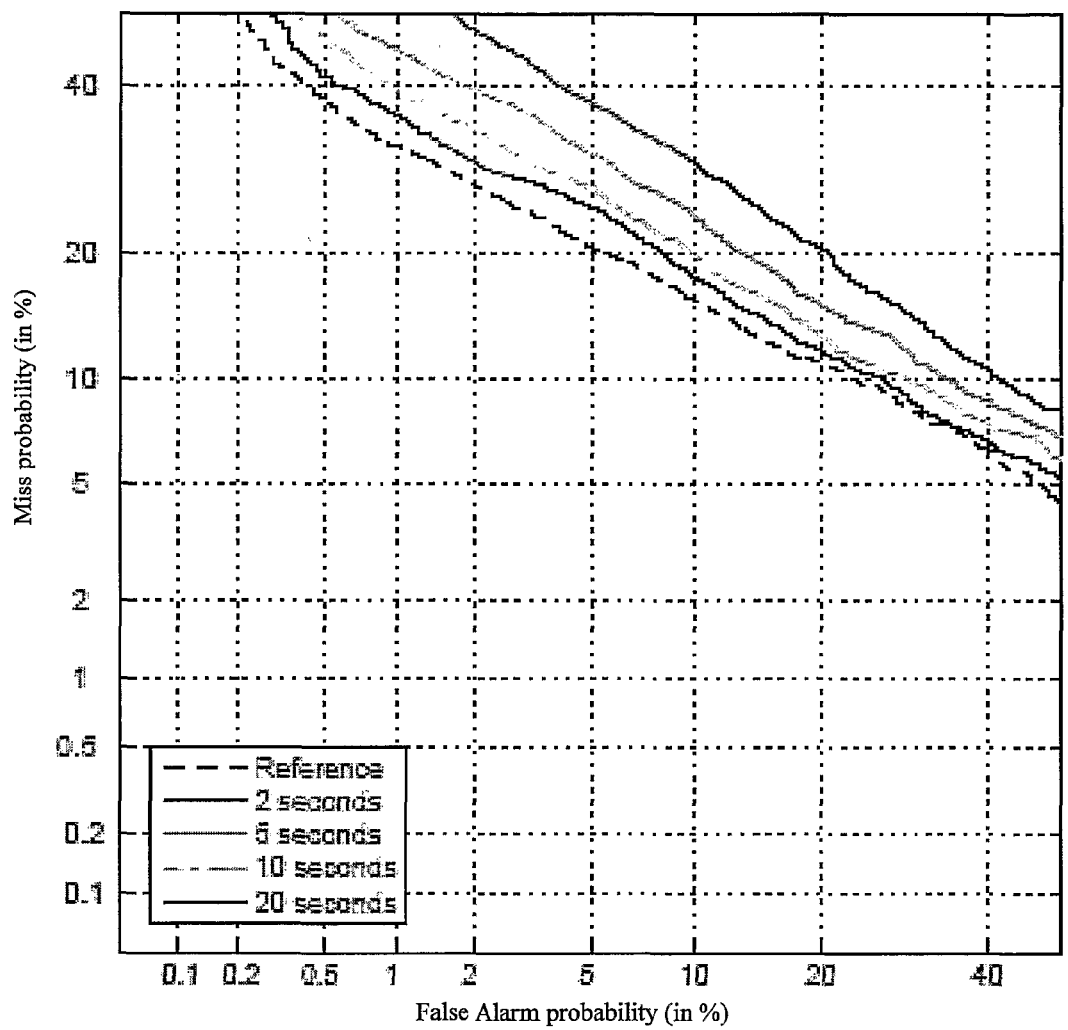
FIG. 1 is a DET plot of the effects of shortened utterances on speaker verification performance.

In Automatic Speaker Verification (ASV) systems, background noise, handset mismatch, channel distortions, room acoustics and restrictions on the available testing and training data are common sources of errors. While the applicants earlier work realised significant improvements in the reduction of errors in ASV systems, the applicant has realised that further improvements in system performance may be gained.

For the present work a baseline test system was implemented. This baseline system being based on the system discussed in WO2005/055200. With the system of WO2005/055200 it was the incorporation of prior information into the speaker model training procedure that realised a significant step forward in the performance and utility of speaker recognition technology. This prior information built into speaker recognition systems the knowledge of what speech is expected to "look" like and constrained the model of a speaker to adhere to this expectation, providing significantly more robust speaker models with less data than was previously possible.

Given the above it would therefore be ideal to produce a verification confidence from a trial, as this is the most useful and usable result from a system designer perspective. Knowing that there is a 96% probability that an utterance was produced by speaker s makes it easy for a designer to employ Bayesian logic to produce the best possible system. This, however, is not practical. Firstly, to do this requires accurately estimating the prior probability of a true trial; this is impossible under most circumstances considering that the non-target class potentially includes the entire population of the world. In a forensic situation, deductive logic and other evidence may help in this regard. Secondly, assuming accurate priors are available, producing a verification confidence also requires that verification scores produced by a system are in fact accurate likelihoods (or likelihood ratios). This is very rarely the case, considering that rudimentary statistical models are usually used to represent speakers and the inherent difficulties in representing every other speaker in a non-target model. Add to this that score normalisation is usually applied and the resulting scores often have little resemblance of true likelihoods.

Some work has investigated the issue of producing accurate likelihood ratio scores as this is the explicit goal of forensic applications of speaker recognition. The analysis and evaluation of speaker verification systems based on the accuracy of output likelihood rations is an emerging topic of recent interest, but speaker verification systems do not in general produce scores that should be interpreted as likelihood ratios. Specifically, a system can be calibrated to approximate likelihood ratios for a particular database but this may not correspond to accurate likelihoods after moving to the environment in which the system is to be deployed.

Given these difficulties with determining an accurate verification confidence, an alternative approach is to determine a method by which one can state that the verification score for this trial lies within the interval $\Lambda_s = a \pm b$ at the 99% confidence level.

While not ideal, this information is still very useful for the deployment and application of a speaker verification system. It provides the capability to:

a. Estimate upper and lower bounds on probability of errors for a verification trial at a particular confidence level based on a development database.

b. Estimate the level of confidence at which the verification score is above or below a particular threshold.

c. Shortcut a verification trial when we are confident that the "true" verification score lies within a particular interval of the current estimate.

d. Shortcut a verification trial when we are confident that the "true" verification score is above or below particular thresholds.

Here the "true" verification score is defined as the score that the verification system would produce given an infinite quantity of testing speech. Assuming a verification score is a random variable drawn from a Gaussian distribution with a mean of the "true" verification score and known variance, it is straightforward to formulate a and b above. The main difficulty arises because the variance is unknown and must be estimated. The variance of a trial score distribution is usually dependent on many factors including whether a trial is a genuine or impostor trial (which is not know a priori), the length of a particular verification utterance and the noise levels and other environmental conditions of the recording. Given these factors the variance must be estimated for each trial individually. This estimation forms the basis of the techniques detailed below.

In the case of c and d above, further assumptions are made on the form of the verification score. Specifically, it is assumed that the verification score is a random process that evolves over time. According to the structure of the speaker verification system in use and the assumptions it is built on, it was assumed that this random process was Gaussian at time t, had a fixed mean ("true" score) and a time-dependent standard deviation, that is $$\Lambda_s(t) \sim N(\mu_s, \sigma_s(t)) \quad (1)$$

Making these assumptions, c and d above can be treated as essentially incremental versions of a and b where at time t the value of (t) must be estimated and stopping criteria assessed.

All of the capabilities outlined above have useful applications. Items a and b are particularly applicable to forensic tasks where the goal is to evaluate the strength of the available evidence. Items c and d are more applicable to verification for access purposes, for example user authentication for telephone transactions. The focus of the present application is the implementation of item d above as it provides the ability to require the least amount of speech to perform a successful verification trial and consequently the least inconvenience to the end user of the technology.

From a research perspective it is preferable to have as much speech as possible, available for each verification, to make the most accurate decision. This is the exact opposite of the design perspective which seeks to place the least possible demand on the end user. Compromise is necessary, thus it is important to have an understanding of the impact of limiting the verification utterance length. The impact of restricted utterances for a typical GMM-UBM system is presented in Table 1 below and FIG. 1.

TABLE 1

The effect of shortened utterances on speaker verification performance.

| System | EER | Min. DCF |
|---|---|---|
| Reference | 13.5% | .0413 |
| 2 sec | 20.4% | .0656 |
| 5 sec | 17.1% | .0543 |
| 10 sec | 15.5% | .0490 |
| 20 sec | 14.5% | .0454 |

These results demonstrate that utterance length, predictably, has a significant effect on overall system performance in the 10-second and shorter range, which is typically of interest for a system designer, as previously observed. One positive is that performance apparently degrades gracefully at least down to 2-second length without catastrophic error rates. It is also evident from the DET plot that the performance degrades consistently across a wide range of operating points. This can be viewed as both an advantage and inefficiency. Consistency and predictability are useful properties for increasing the flexibility of a system, allowing it to be used in a variety of situations. However, for a particular application where the scenario is well defined and the desired operating point is known, only the performance at that point is relevant; devoting resources to improving performance at other operating points is wasteful.

The most immediate and appealing use of the confidence based verification methods is to provide a verification decision with minimal speech. This is achieved by making a verification decision as soon as we are confident the "true" verification score is above or below the specified threshold based on the confidence interval of the current estimate of the "true" score.

Figure 2A:
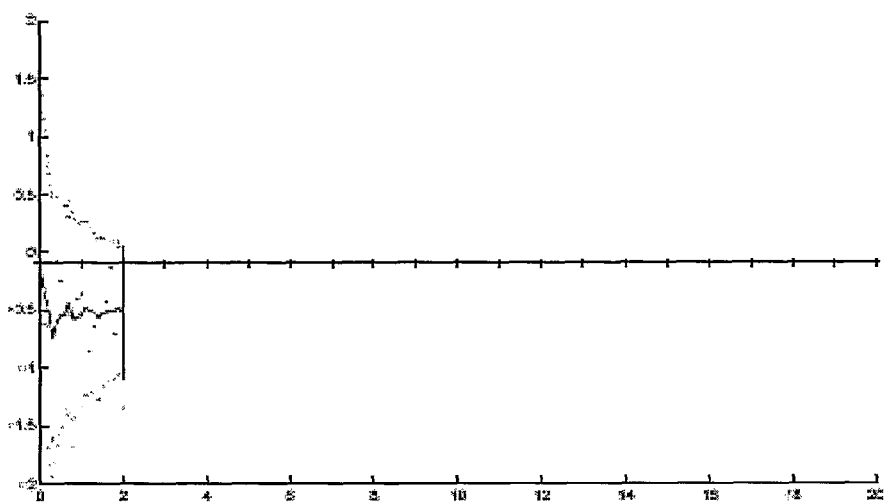
FIG. 2A to 2C are examples of a verification trial using the early decision method according to one embodiment of the invention.
Figure 2B:
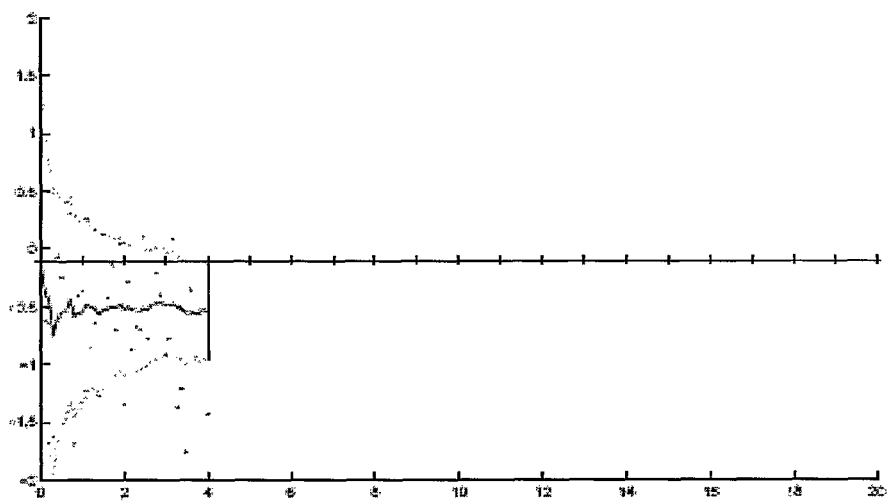
Figure 2C:
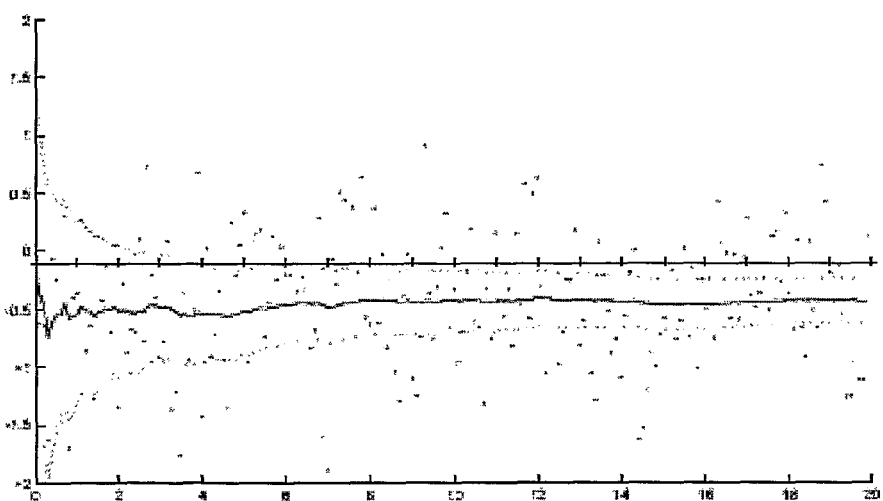

An example of this process is presented in FIGS. 2A to 2C. In these figures, the samples used to estimate the distribution are represented as dots, the mean evolving verification score estimate is shown as a thick solid line with the 99% confidence interval of this estimate depicted with dashed lines above and below the estimate. The verification threshold of −0.1 is shown as a horizontal line through the centre of the figures. After two seconds of the trial FIG. 2A the estimate of the verification score is quite erratic, which is reflected in the wide confidence interval, but looks to be converging to a point below the threshold. By four seconds FIG. 2B the estimate seems to be more stable as more samples become available and the width of the confidence interval has narrowed to be entirely below the threshold. At this point, after only four seconds, we can be confident that the verification score will continue to lie below the threshold and thus make a reject decision for this trial. FIG. 2C confirms that the verification score does in fact continue to be below the threshold and the confidence interval continues to narrow.

Most confidence-based methods for verification make use of the ability to estimate confidence intervals based on the observed sequence of frame scores. This ability in turn relies on estimating the variance of the mean estimate distribution from the sequence of frame scores. To this end the applicant has devised a number of techniques for calculating this estimate with an increasing degree of sophistication to combat issues encountered with real data.

Unless otherwise stated the baseline system utilised in the experimental evaluation of the techniques for calculating the confidence measure discussed below utilise a fully coupled GMM-UBM modelling using iterative MAP adaptation. A complete discussion of such a system can be found in the applicant's earlier filed International Application WO2005/055200. In the present case an adaptation relevance factor of τ=8 and 512 component models are used throughout. Unless otherwise stated, convergence of the speaker model adaptation was assumed after 10 iterations of the E-M MAP procedure. Top-N ELLR scoring is used as the base verification score with N=5. Score normalisation is also generally applied. All experiments were then conducted on the QUT 2004 protocol (which is a slightly modified versions of standard NIST speaker recognition protocol) using conversational telephony speech drawn from the Mixer corpus. The focus of the results is primarily on the 1-side training condition of this corpus.

As discussed above the concept of the confidence measure makes us of the verification score produced the speaker verification system. In the case of the test system outlined above the verification score is the expected log-likelihood ratio of the target speaker to the UBM. The expectation is taken over the individual frame-based log-likelihood ratios for the test utterance, $$\Lambda_S = \frac{1}{T} \sum_{t=1}^{T} l_S(t) \quad (2)$$

$$= \frac{1}{T} \sum_{t=1}^{T} \log\left(\frac{p(x_t|\lambda_s)}{p(x_t|\lambda_{ubm})}\right)$$

where, in the case of Gaussian mixtures, $$p(x|\lambda) = \sum_{c=1}^{C} \omega_c g(x|\mu_c, \Sigma_c) \quad (3)$$

where $\omega_c$ is the mixing factor and $g(x|\mu_c,\Sigma_c)$ denotes the multivariate Gaussian density with mean $\mu_c$ and variance matrix $\Sigma_c$ for mixture component c.

1. Naïve Variance Estimate

As can be seen from the above discussion the verification score is a sum of the log-likelihood ratios of individual frames. The central limit theorem states that a sum of random variables (such as this) will exhibit a Gaussian distribution. Furthermore it is a commonly stated assumption that the feature vectors $x_t$ and, by consequence, the frame log-likelihood ratios $l_S(t)$ are independent and identically distributed (iid) random variables. Thus, if $l_S(t)$ has sample mean $m_l$ and variance $s_l^2$, the ELLR verification score will have a mean and variance approximated by $$\mu_s = m_l \quad (4)$$

$$\sigma_s^2 = \frac{s_l^2}{T-1} \quad (5)$$

Thus, for any sequence of frames X it is possible estimate the mean and variance of the ELLR score.

Using these estimates of the ELLR score statistics, a confidence interval for the "true" score can be calculated using a confidence level and the Gaussian Cumulative Density Function (CDF).

Figure 3:
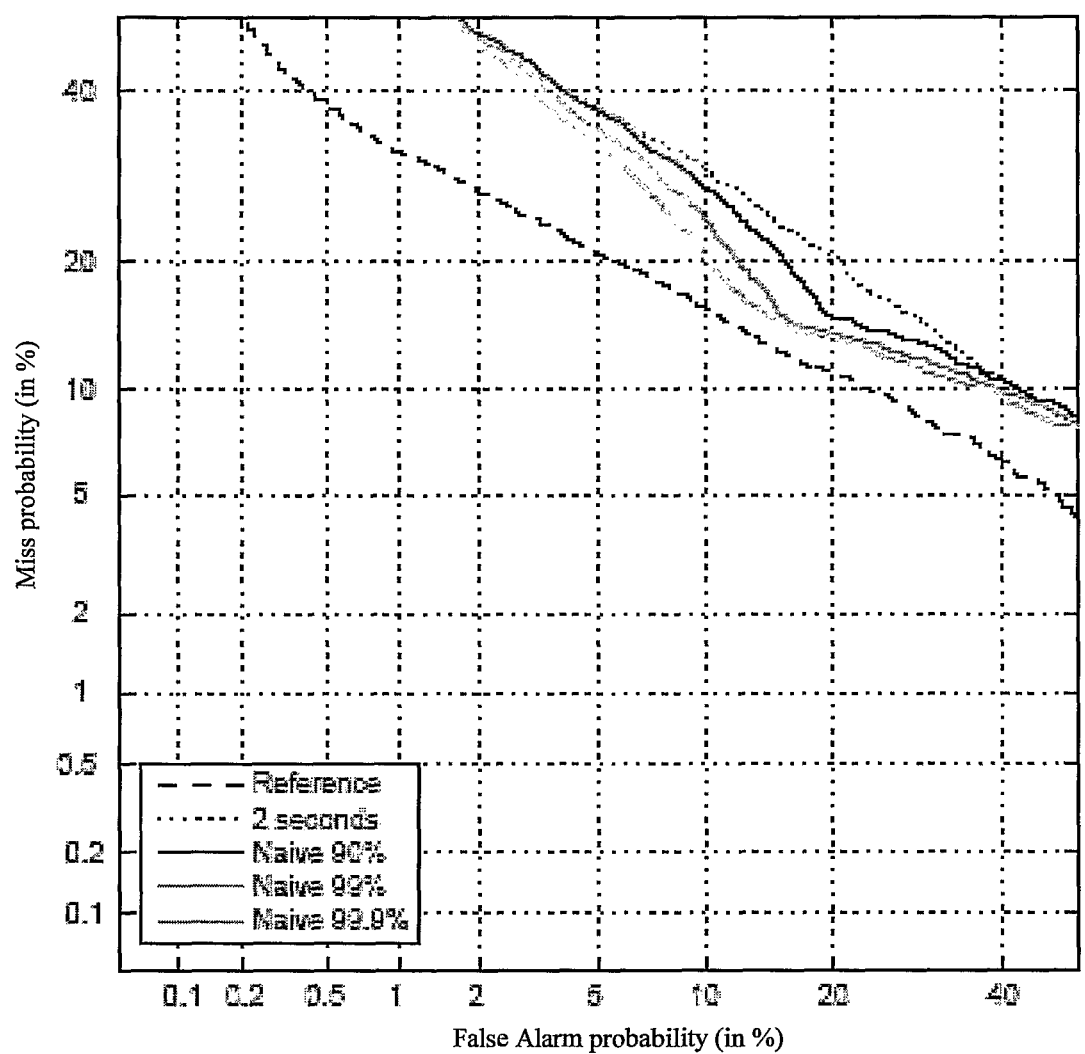
FIG. 3 is a DET plot using the naïve method at the EER operating point.

FIG. 3 shows the performance of a system employing early decision scoring using the naïve frame-based estimate in equation (5) with the threshold set for the equal error rate operating point at three confidence levels, 90%, 99% and 99.9%. These confidence levels are the minimum confidence that the "true" verification score is above or below the EER threshold required by the system to make an early verification decision. Also shown is the DET curve for the baseline reference system using all available speech and a system using a fixed 2-second utterance length (dotted curve) as a "worst case" system, given the minimum length constraints. As can be seen in FIG. 3 there is a significant drop in performance compared to the reference system due to the shortcut stopping criterion however there are some interesting aspects to this plot. First, the degradation in performance is actually quite modest as the reference system used at least 10 times the amount of speech to make a verification decision, as described in table 2 below.

TABLE 2

Verification results using the naïve method at the EER operating point.

| | | Trial Length | | Shortcut Errors | |
|---|---|---|---|---|---|
| System | EER | Median | Mean | Target | Impostor |
| Reference | 13.5% | 110.2 | 109.6 | — | — |
| Naïve at 90% | 17.5% | 2 | 2.8 | 8.1% | 13.3% |
| Naïve at 99% | 15.4% | 2 | 5.9 | 6.2% | 8.0% |
| Naïve at 99.9% | 14.9% | 3 | 10.0 | 4.2% | 4.9% |

Figure 4:
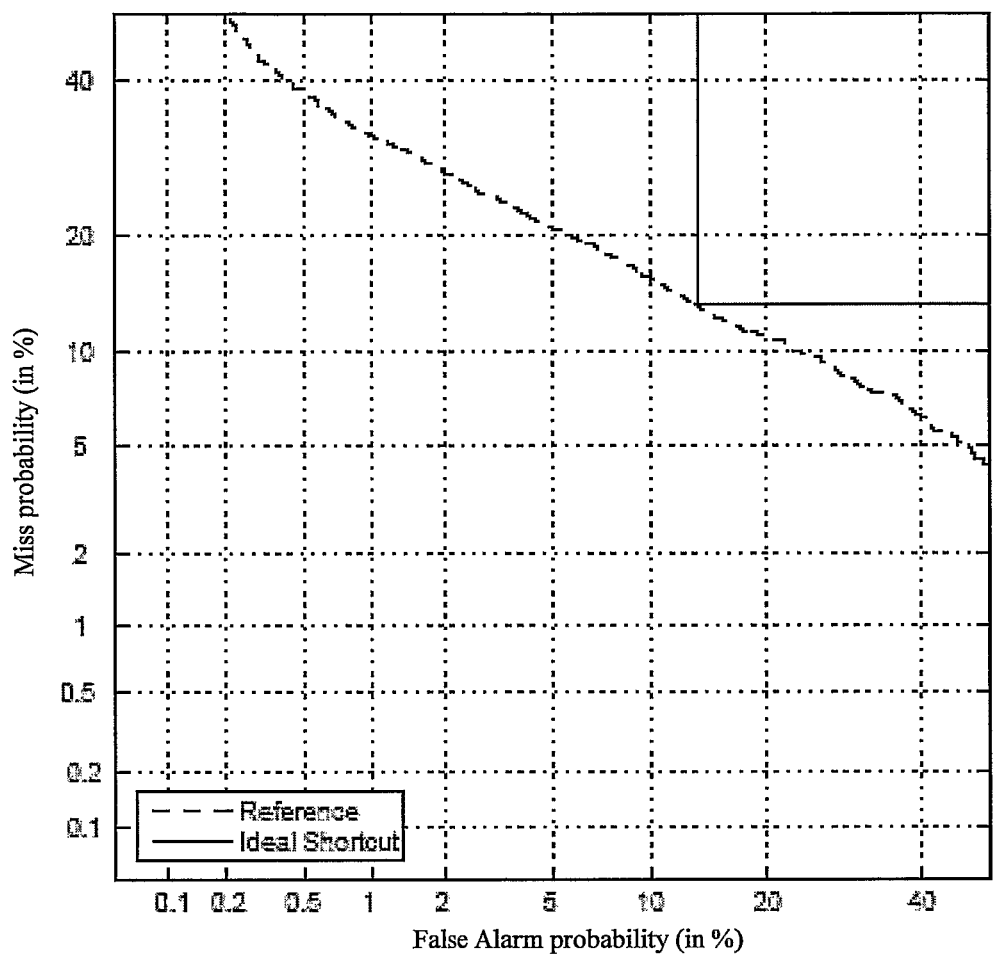
FIG. 4 is a DET plot of the ideal early verification decision scoring system according to one embodiment of the invention.

Second, the performance of the system improves using higher confidence levels providing a better EER; this observation is backed by table 2 with the naïve 99.9% system showing an EER 2.6% lower than at the 90% confidence level. Third, and more interestingly, the DET curve for these systems veers away from the reference system the farther it is from the EER operating point, this is particularly evident in the low false alarm region. The performance curves of the early decision systems drop back to meet the 2-second worst-case system in these areas. This characteristic is a direct consequence of the shortcut method as the system is only interested in the performance at the specified threshold and essentially trades performance in other areas for shorter test utterances. In the ideal case the system would only provide performance at the threshold and trade all other performance for shorter trials shown in FIG. 4. Using the equal error rate as the criterion, the ideal system will provide identical performance to the reference system.

By comparing the tables 1 and 2 it can be seen that the shortcut method is effective in trading performance at a specific operating point for shorter trials. Table 2 shows that the confidence levels presented roughly correspond in terms of mean trial length to the short utterances in table 1 but demonstrate considerably less degradation in EER compared to the reference system.

Comparing the 5 sec results to the 99% confidence results the EER improves from 17.1% to 15.4%, almost halving the gap to the reference, with similar average test utterance lengths.

Additionally, the mean test utterance lengths are dominated by a relatively small number of long trials with the majority of trials providing a result within 2 seconds, as indicated by the median trial lengths.

Figure 5:
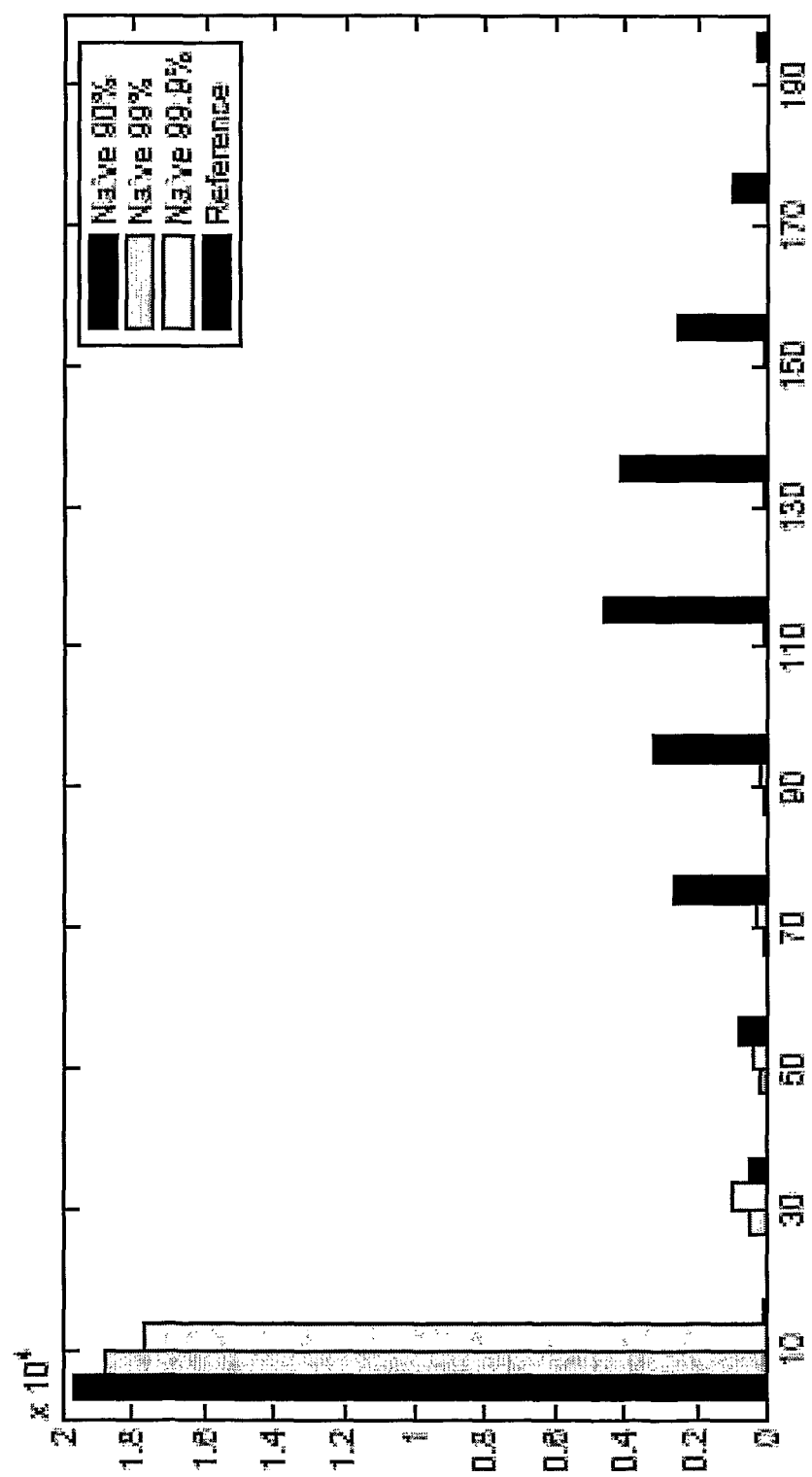
FIG. 5 is a histogram of the test utterance length using the naïve variance estimate method with the EER operating point.

This last point has an astonishing implication, for most trials a text-independent speaker verification system will produce the same decision with only 2 seconds of speech that it will with 2 minutes of speech. A better understanding of the distribution of trials lengths can be taken from the histogram shown in FIG. 5.

Also presented in the two rightmost columns of table 2 are the rates of errors introduced by the early stopping criteria for target and impostor trials, respectively. These represent the trials that are accepted as above the threshold according to the stopping criteria but produce a negative result according to the reference system using all available speech, and vice-versa. This is the loss introduced by the shortcut method and, if the distribution assumptions and estimates are accurate, should closely match the confidence levels specified.

Two points can be made based on these numbers, the error rates do not match the specified confidence levels well and, also, there are marginally more errors for impostor trials than target trials.

The fact that the error rates don't reflect the desired confidence levels suggests two possible issues. Firstly, that the ELLR variance estimates are not sufficiently accurate particularly when based on a small number of frames and are thus causing the scoring process to be terminated prematurely.

The second possible issue is that the actual distribution of the frame scores, and by extension of the ELLR scores, does not fit well with the assumed Gaussian shape on which the confidence level thresholds are based. Observations of frame score distributions show that this is in fact a valid assertion as they exhibit significant third and fourth order statistics, however, the law of large numbers states that the ELLR score will tend towards normality. The issue, then, is that for very short utterances there is not a "large number" of frame scores. Since the degree to which the shortcut performance approaches the reference system is typically more important than the accuracy of the confidence levels.

Figure 6:
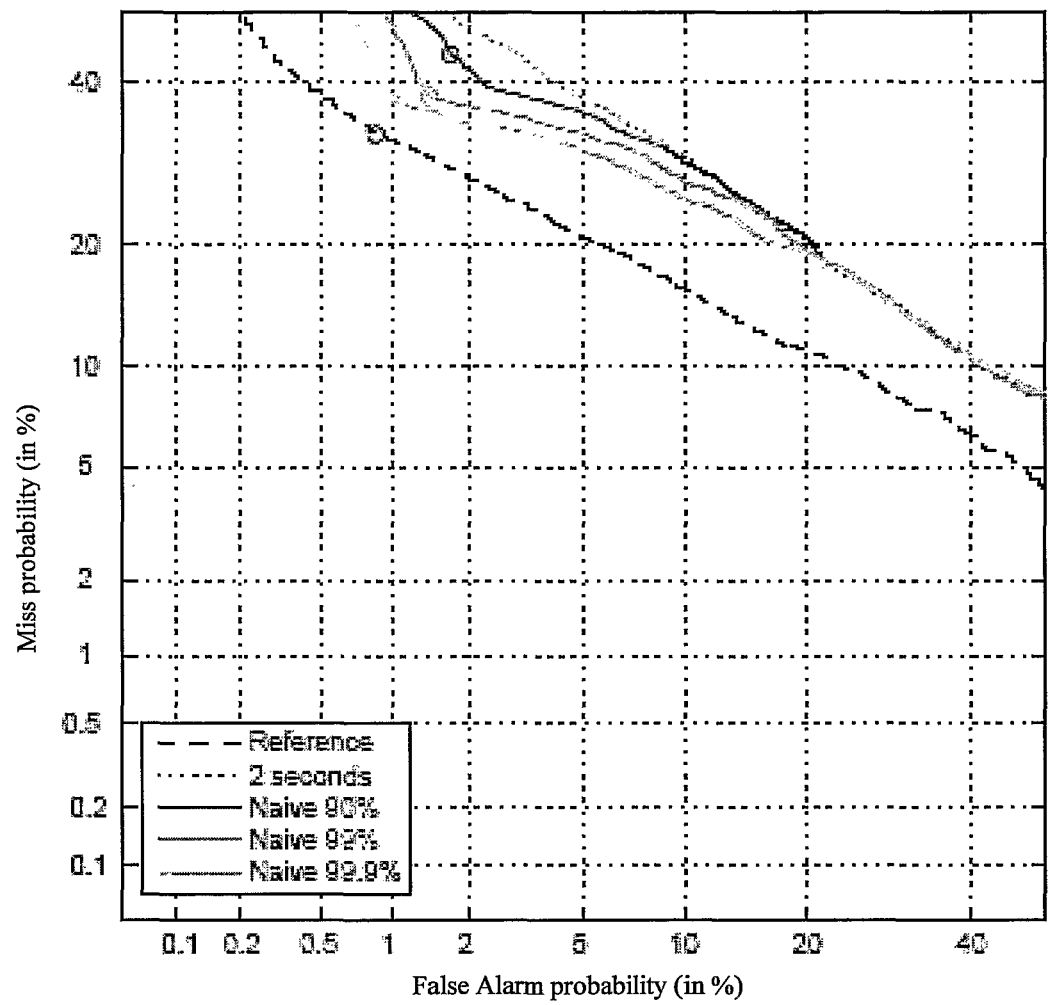
FIG. 6 is a DET plot using the naïve method with the minimum DCF operating point.

As this is a threshold-based algorithm, it can in theory be used at any operating point as required by the application. FIG. 6 and table 3 (below) describe the performance of the shortcut method at the NIST minimum detection cost function operating point. As can be seen, many of the characteristics of this performance closely resemble the performance at the EER operating point, specifically the DET curve produces the best performance at the desired minimum DCF operating point and drops away in all other operating regions, and the higher confidence levels produce results closer to the reference system.

TABLE 3

Verification results using the naïve method with the minimum DCF operating point.

| System | Min. DCF | Trial Length | | Shortcut Errors | |
| --- | --- | --- | --- | --- | --- |
| | | Median | Mean | Target | Impostor |
| Reference | .0413 | 110.2 | 109.6 | — | — |
| Naïve at 90% | .0608 | 2 | 2.2 | 14.9% | 2.0% |
| Naïve at 99% | .0519 | 2 | 2.8 | 11.5% | 1.0% |
| Naïve at 99.9% | .0472 | 2 | 3.6 | 8.3% | 0.6% |

Unlike with an EER threshold, the errors introduced by the early decision method are not evenly distributed between the target and impostor trials, with the target trial errors far outweighing the low rate of impostor trial errors. From this observation it is hypothesised that this discrepancy is due to the threshold lying much closer to the centre of the target trial score distribution (at approximately 35% miss rate) compared to near the tail of the impostor scores distribution (approximately 1% false alarms).

Hence it is simpler to dismiss a larger proportion of the impostor trials due to the increased distance of the score to the threshold.

It is also evident from table 3 that even less speech was required to produce the minimum DCF results than for the EER threshold case, as a median trial length of 2 sec is used for all confidence levels, and the mean length only reaches 3.6 sec.

2. Estimate with Correlation

Unfortunately, acoustic features commonly used for speaker verification, such as MFCC features, exhibit high levels of correlation between consecutive observation frames. This is essentially by definition, considering that the short-term spectra and cepstra typically calculated for consecutive frames share two-thirds of their waveform samples and that delta cepstra explicitly average over a number of frames. This is also due to the characteristics of the mechanics of speech production as there are limits on the rate at which vocal tract shape can change, this is a fact exploited by techniques such as RASTA filtering. This correlation obviously voids the commonly cited assumption of statistically independent and identically distributed (iid) feature vectors.

Due to this invalidity of the iid assumption, the estimated ELLR variance is invalid and empirical evidence shows that it is often underestimated, particularly with short sequences. For this reason, it is necessary to develop an alternative estimate to reduce the effect of this correlation. In the applicant's present research a transformation approach was adopted to reduce the correlation by producing a series of ELLR estimates $y_S$ from short, fixed-length, non-overlapping frame sequences, $$y_s(i) = \frac{1}{N} \sum_{t=N_i}^{N(i+1)-1} l_s(t) \quad (6)$$

where N is the length of the short frame sequences. If N is sufficiently large, the correlation between successive $y_S(i)$ drops to a negligible level. From $y_S$, it is then possible to estimate the overall ELLR mean and variance as $$\mu_s = m_y \quad (7)$$

$$\sigma_s^2 = \frac{s_y^2}{T/N - 1} \quad (8)$$

where $m_y$, and $s_y^2$ are the sample mean and sample variance of $y_S$ respectively.

Table 4 below shows the performance of the shortcut scoring method using the decorrelated distribution estimates from equations (7) and (8). A range of short frame sequence length values, N, are assessed with the longer sequences reducing the degree of correlation in the samples used to estimate the ELLR score distribution. A value of N=1 is equivalent to the naïve, frame-based estimate described previously. With a typical frame rate of 100 frames per second, a value of N=100 averages the frame scores over the period of a whole second of active speech.

TABLE 4

Verification results comparing the naïve and decorrelated methods at the EER operating point.

| System | EER | Trial Length | | Shortcut Errors | |
|---|---|---|---|---|---|
| | | Median | Mean | Target | Impostor |
| Reference 90% Confidence | 13.5% | 110.2 | 109.6 | — | — |
| N = 1 (Naïve) | 17.5% | 2 | 2.8 | 8.1% | 13.3% |
| N = 10 | 15.9% | 2 | 5.1 | 6.7% | 9.2% |
| N = 100 99% Confidence | 16.4% | 2 | 4.9 | 7.3% | 10.9% |
| N = 1 (Naïve) | 15.4% | 2 | 5.9 | 6.2% | 8.0% |
| N = 10 | 14.4% | 3 | 13.9 | 2.8% | 2.9% |
| N = 100 99.9% Confidence | 15.2% | 4 | 14.7 | 4.7% | 6.0% |
| N = 1 (Naïve) | 14.9% | 3 | 10.0 | 4.2% | 4.9% |
| N = 10 | 13.9% | 5 | 21.5 | 1.7% | 1.1% |
| N = 100 | 14.8% | 7 | 22.8 | 3.5% | 4.2% |

It can be seen from these results that decorrelating the samples used to estimate the ELLR score distribution does in fact reduce the proportion of errors introduced by the shortcut scoring method (the two rightmost columns of table 4), producing performance closer to that of the reference system. The best performing configuration in table 6 drops only 0.4% at the EER operating point.

Figure 7:
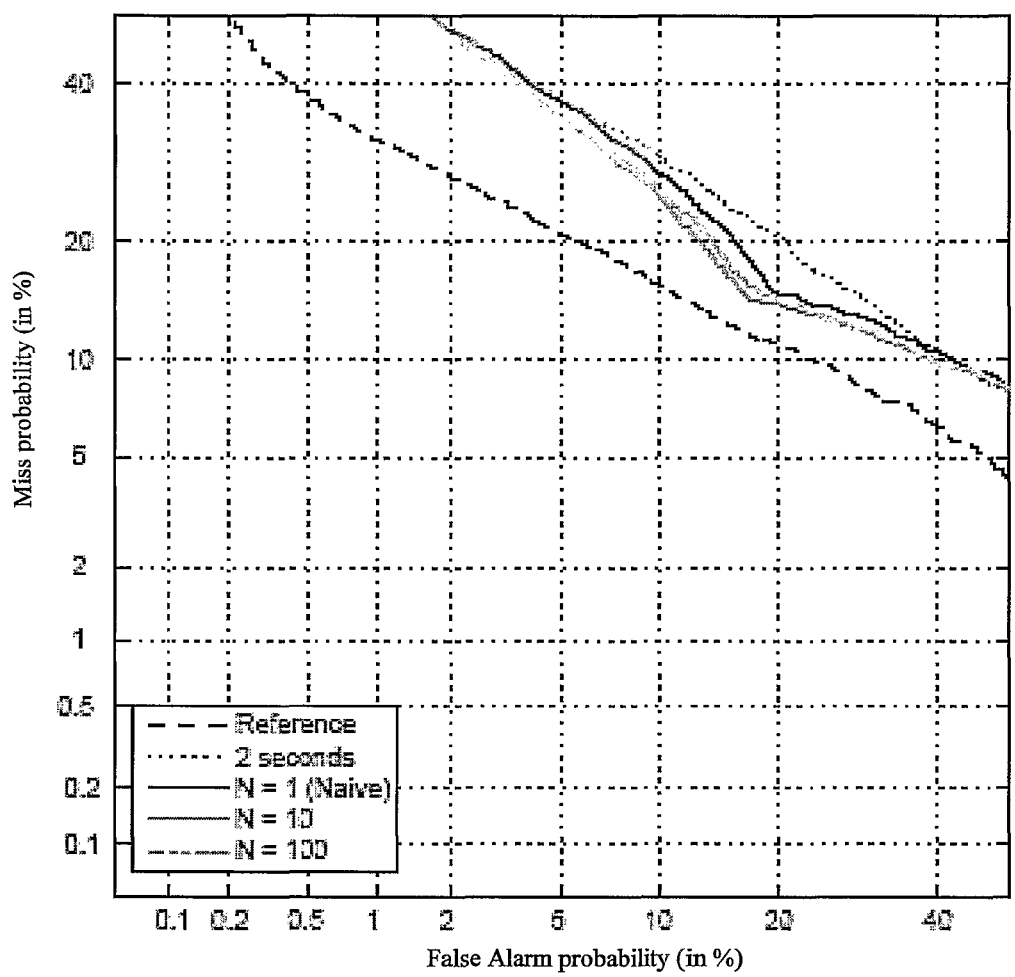
FIG. 7 is a DET plot comparing the naïve and decorrelated methods at the EER operating point using a 99% confidence level.

It is also apparent that the choice of short sequence length N is a trade-off between conflicting concerns, as also demonstrated by FIG. 7. If the sequences are too short the system will not benefit from the decorrelating effect. If the sequences are too long, such as the case with N=100, the samples are decorrelated however the number of samples with which to estimate the ELLR variance are severely limited. For example after 2 sec of active speech there will only be two samples from which to estimate the variance in the N=100 case, this will clearly not be a reliable estimate. A value of N=10 seems to provide a good balance and demonstrates clearly superior performance to the other configurations tested.

There is unfortunately an increase in both the mean and median utterance length associated with the decorrelated estimation method, however, despite this increase the median utterance lengths required are still extremely short at around 2-5 seconds.

These outcomes are also relevant at the minimum DCF operating point, with the best configuration, with N=10, giving away only 0.0020 to the reference system. Table 5 summarises the results for the minimum DCF threshold with N=10. These results also suggest that at this operating point the median utterance length is still extremely low, staying at the 2 sec minimum throughout.

TABLE 5

Verification results comparing the naïve and decorrelated methods at the minimum DCF operating point.

| System | Min. DCF | Trial Length | | Shortcut Errors | |
|---|---|---|---|---|---|
| | | Median | Mean | Target | Impostor |
| Reference | .0413 | 110.2 | 109.6 | — | — |
| N = 10 at 90% | .0537 | 2 | 2.8 | 12.2% | 1.2% |
| N = 10 at 99% | .0454 | 2 | 4.8 | 5.6% | 0.3% |
| N = 10 at 99.9% | .0433 | 2 | 6.9 | 3.1% | 0.1% |

For the above techniques of calculating the confidence measure to be effectively employed in a practical system, it is important to robustly estimate the variance of the frame log-likelihood ratios with a very limited number of samples.

This issue is also exacerbated by the correlated nature of these scores. One possible method to produce a more robust estimate of this variance is to introduce a priori information, with the resulting estimate given by $$\hat{s}^2 = \frac{\tau\kappa^2 + (M-1)s^2}{\tau + (M-1)} \quad (9)$$

where $s^2$ is unbiased sample variance from M samples and $\kappa^2$ and $\tau$ are hyperparameters of the prior distribution, which takes the form of a Dirichlet distribution. This estimate can then be used to produce more robust estimates of the ELLR variance, as estimated in equations (5) and (8) above.

By incorporating a priori information in the variance estimate it is possible to reduce the performance discrepancy between the reference system and the early decision version. This improved performance unfortunately comes at the cost of longer verification utterances both in terms of the mean and median length statistics, as presented below in tables 6 and 7. The effect of varying both the prior hyperparameter $\kappa^2$ and the target confidence level as both can be tuned to produce similar levels of performance (the hyperparameter $\tau$ was set to 1 for these experiments). For example, from table 8 an EER of approximately 14.5% can be achieved at a 90% confidence level with $\kappa^2=4$ and at a 99% confidence level with no prior ($\kappa^2=0; \tau=0$). While these configurations produce similar error rates, they have different utterance length characteristics, specifically, the configuration with no prior has a 1-second shorter median utterance length of 3 seconds but the mean utterance length is almost 4 seconds longer.

TABLE 6

Verification results incorporating a priori information in the variance estimate at the EER operating point.

| System | EER | Trial Length | | Shortcut Errors | |
|---|---|---|---|---|---|
| | | Median | Mean | Target | Impostor |
| Reference 90% Confidence | 13.5% | 110.2 | 109.6 | — | — |
| No prior | 15.9% | 2 | 5.1 | 6.7% | 9.2% |
| $\kappa^2 = 1$ | 15.1% | 2 | 6.3 | 5.9% | 7.3% |
| $\kappa^2 = 2$ | 14.8% | 3 | 7.8 | 5.2% | 5.6% |
| $\kappa^2 = 4$ 99% Confidence | 14.5% | 4 | 10.0 | 4.1% | 4.1% |
| No prior | 14.4% | 3 | 13.9 | 2.8% | 2.9% |
| $\kappa^2 = 1$ | 13.9% | 6 | 17.1 | 2.2% | 1.8% |
| $\kappa^2 = 2$ | 13.8% | 7 | 19.2 | 2.1% | 1.3% |
| $\kappa^2 = 4$ | 13.8% | 9 | 22.2 | 1.3% | 0.8% |

TABLE 6-continued

Verification results incorporating a priori information in the variance estimate at the EER operating point.

| | | Trial Length | | Shortcut Errors | |
|---|---|---|---|---|---|
| System | EER | Median | Mean | Target | Impostor |
| 99.9% Confidence | | | | | |
| No prior | 13.9% | 5 | 21.5 | 1.7% | 1.1% |
| $\kappa^2 = 1$ | 13.7% | 9 | 25.2 | 1.3% | 0.6% |
| $\kappa^2 = 2$ | 13.7% | 11 | 27.4 | 0.9% | 0.4% |
| $\kappa^2 = 4$ | 13.6% | 14 | 30.4 | 0.5% | 0.2% |

TABLE 7

Verification results incorporating a priori information in the variance estimate at the minimum DCF operating point.

| | | Trial Length | | Shortcut Errors | |
|---|---|---|---|---|---|
| System | Min. DCF | Median | Mean | Target | Impostor |
| Reference | .0413 | 110.2 | 109.6 | — | — |
| 90% Confidence | | | | | |
| No prior | .0537 | 2 | 2.8 | 12.2% | 1.2% |
| $\kappa^2 = 1$ | .0505 | 2 | 3.0 | 10.9% | 0.9% |
| $\kappa^2 = 2$ | .0474 | 2 | 3.4 | 9.0% | 0.6% |
| $\kappa^2 = 4$ | .0450 | 2 | 4.0 | 7.1% | 0.4% |
| 99% Confidence | | | | | |
| No prior | .0454 | 2 | 4.8 | 5.6% | 0.3% |
| $\kappa^2 = 1$ | .0436 | 2 | 5.5 | 4.3% | 0.1% |
| $\kappa^2 = 2$ | .0435 | 3 | 6.3 | 3.8% | 0.1% |
| $\kappa^2 = 4$ | .0430 | 4 | 7.6 | 3.0% | 0.1% |
| 99.9% Confidence | | | | | |
| No prior | .0433 | 2 | 6.9 | 3.1% | 0.1% |
| $\kappa^2 = 1$ | .0428 | 4 | 7.7 | 2.6% | 0.0% |
| $\kappa^2 = 2$ | .0427 | 5 | 8.9 | 2.2% | 0.0% |
| $\kappa^2 = 4$ | .0421 | 6 | 10.6 | 1.6% | 0.0% |

Figure 8:
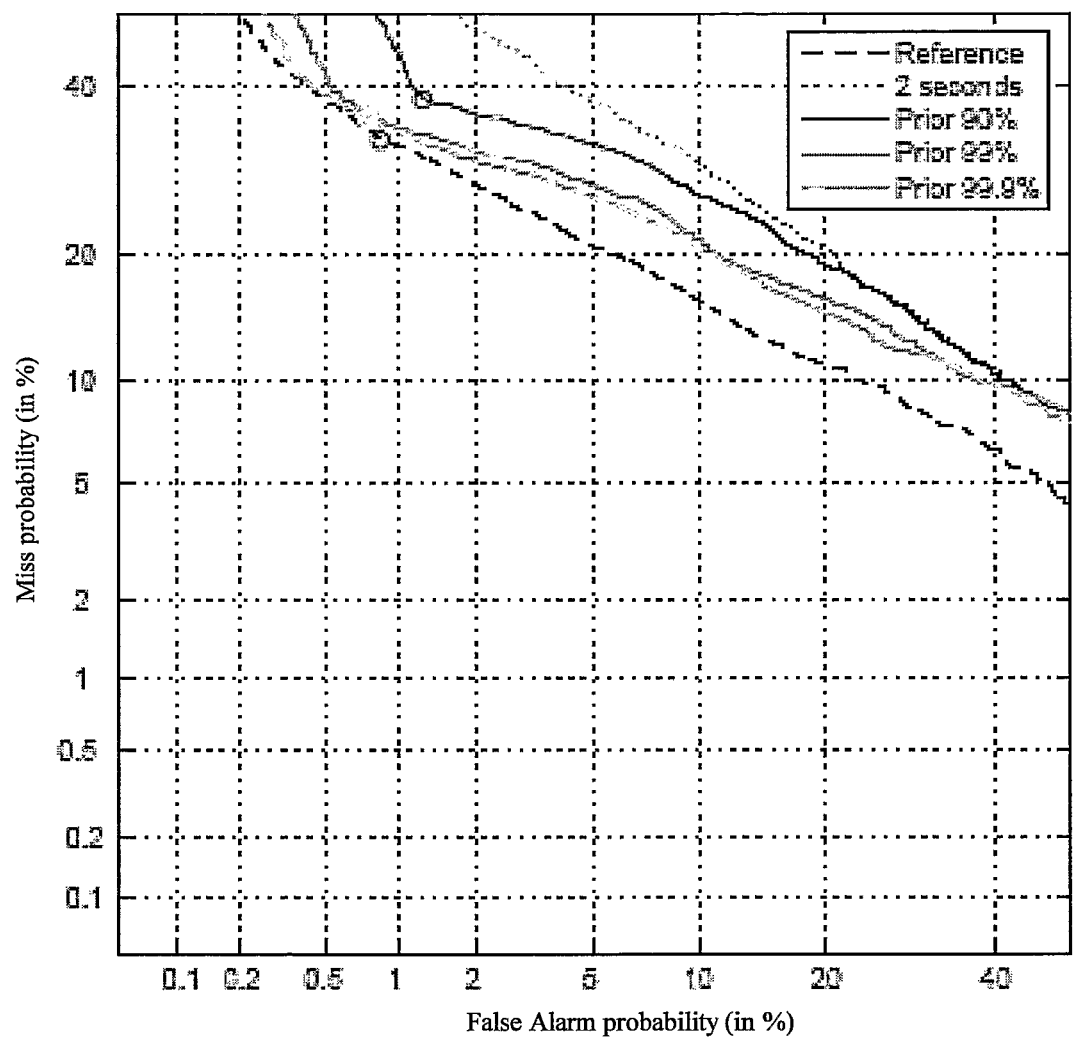
FIG. 8 is a DET plot of the variance estimation with prior method at the minimum DCF operating point.

A DET plot of the variance estimation with prior information at the minimum DCF operating point is shown in FIG. 8.

4. Verification Score Normalisation

Typically, raw scores output by speaker verification systems are further processed to normalise for factors such as the quality of the trained speaker model, mismatch between the training and testing conditions and the linguistic content in the test utterance. Z-Norm is an example of a score normalisation technique that normalises the verification score by the mean and variance of the speaker model's response to a set of impostor trials. H-Norm is a similar technique that additionally characterises the speaker models response to utterances from each different type of telephone handset.

It is straight forward to apply Z-Norm to the applications described above as it can be characterised as a simple linear transform of the frame-based scores. If the Z-Norm statistics are given by $\mu_z$ and $\sigma_z$ then the normalised ELLR score is given by, $$\Lambda_z(s) = \frac{\Lambda(s) - \mu_z(s)}{\sigma_z(s)} \quad (10)$$
$$= a\Lambda(s) + b$$

where $a=1/\sigma_z(s)$ and $b=\mu_z(s)/\sigma_z(s)$. As the ELLR score is a scaled sum of the frame scores, this transform can alternatively be applied directly to the individual frame scores, $$\Lambda_z(s) = \frac{1}{T}\sum_{t=1}^{T} l'_s(t); \quad (11)$$

$$l'_s(t) = al_s(t) = b \quad (12)$$

Hence, the same linear transform applies to the distribution of the estimated ELLR score. From the naïve estimate, equations (24) and (25) become $$\mu_{s|z} = a\mu_s + b \quad (13)$$
$$= am_l + b$$

$$\sigma_{s|z}^2 = a^2 \sigma_s^2 \quad (14)$$
$$= \frac{a^2 s_l^2}{T-1}$$

The same applies to H-Norm and C-Norm, which can both be considered as extensions of Z-Norm.

Figure 9:
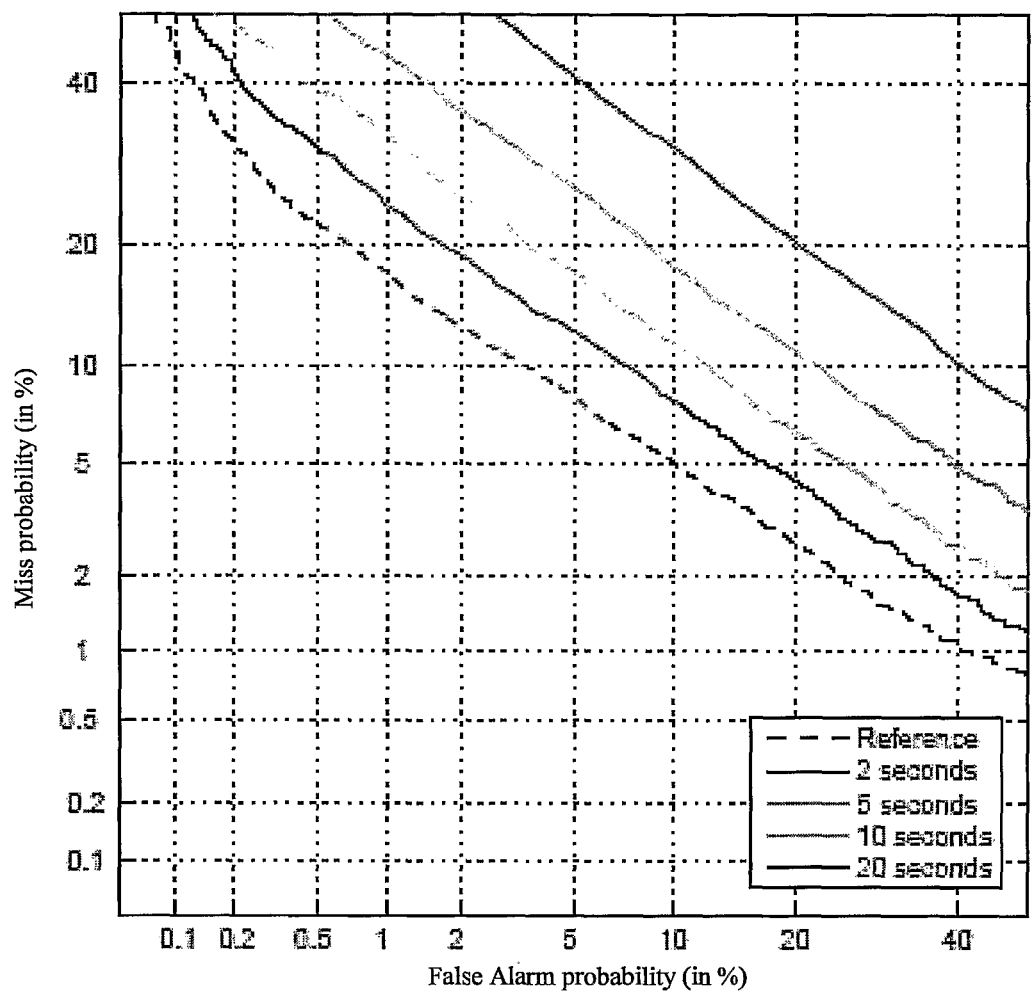
FIG. 9 is a DET plot of the effects of shortened utterances on speaker verification performance using Z-Norm score normalisation.
Figure 10:
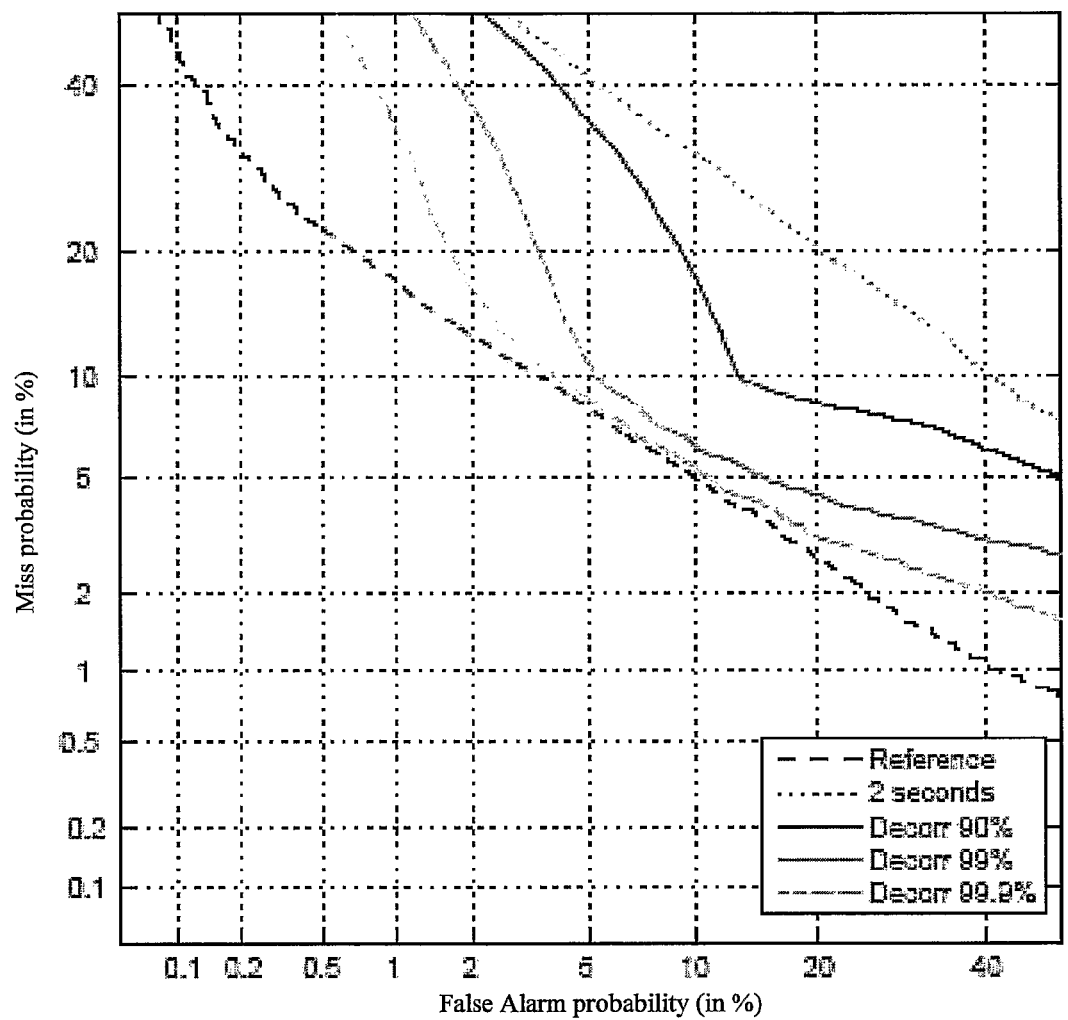
FIG. 10 is a DET plot of the variance estimation with prior method at the EER operating point using Z-Norm score normalisation.
Figure 11:
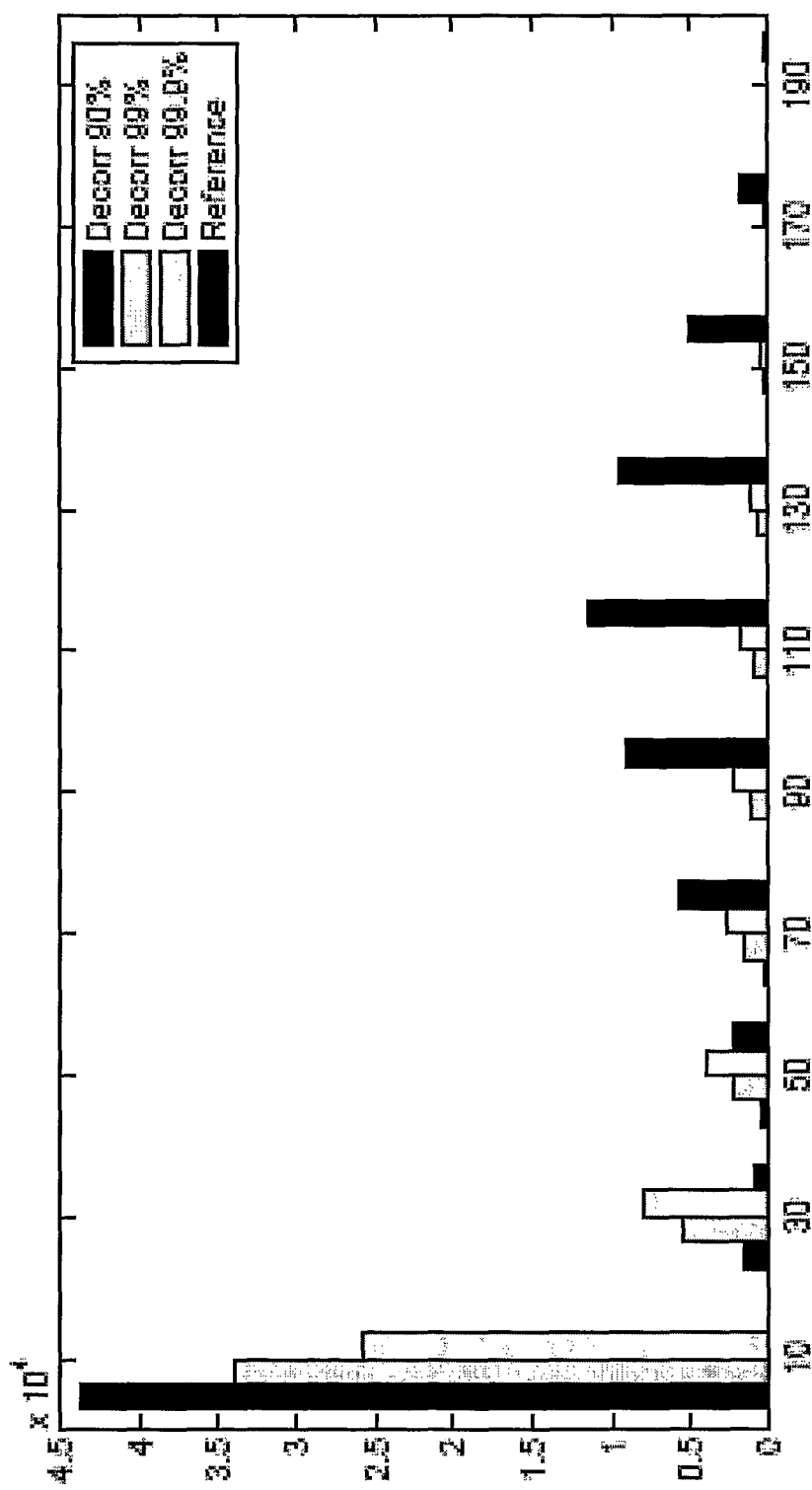
FIG. 11 is a histogram of the test utterance length with the prior method at the EER operating point using Z-Norm score normalisation.

For comparison purposes, FIG. 9 shows the performance of a reference system using Z-Norm score normalisation. While it can be seen that the score normalisation dramatically improves the performance of the reference system, shortening these trials degrades the performance more substantially than for a system without normalisation, as shown in table 8. Applying the early verification decision method to this Z-Norm system produces results analogous to systems without score normalisation, as demonstrated in FIG. 16. Due to the substantial drop in performance with short utterances the early decision method has a particularly dramatic effect on the DET curves.

TABLE 8

The effect of shortened utterances on speaker verification performance using Z-Norm score normalisation.

| System | EER | Min. DCF |
|---|---|---|
| Reference | 6.6% | .0266 |
| 2 sec | 20.1% | .0713 |
| 5 sec | 14.1% | .0533 |
| 10 sec | 10.8% | .0426 |
| 20 sec | 8.8% | .0340 |

It was anticipated that the early decision method would produce decisions at least as quickly with Z-Norm applied as with no normalisation and, since the true and false score distributions are better separated, that shorter utterances may be used. The experimental evidence indicates that this was not the case, however, as shown in the mean and median trial lengths from table 9 compared to the trial lengths in table 2.

TABLE 9

Verification results using the decorrelated method at the EER operating point using Z-Norm score normalisation.

| | | Trial Length | | Shortcut Errors | |
|---|---|---|---|---|---|
| System | EER | Median | Mean | Target | Impostor |
| Reference | 6.6% | 108.5 | 107.6 | — | — |
| N = 10 at 90% | 12.0% | 3 | 6.6 | 6.9% | 10.6% |
| N = 10 at 99% | 7.6% | 8 | 20.6 | 2.0% | 2.4% |
| N = 10 at 99.9% | 6.8% | 17 | 32.3 | 0.6% | 0.6% |

The increase in both the mean and median trials lengths indicates that the task of making a verification decision was in fact complicated by the use of Z-Norm. It is hypothesised that this outcome may be the result of the offset introduced by $b=\mu_Z(s)/\sigma_Z(s)$ into the score estimate. With a small number of samples the "true" score estimate is initially dominated by the speaker-dependent value of b causing a greater number of samples to prove this prior information incorrect.

The lengthier trials in this case can be viewed as a positive outcome in two ways. Firstly the utterance lengths are still considerably shorter than using the entire utterance and provide far superior performance when compared to specifying a fixed short utterance length. For example, looking at the 99% confidence level results in Table 6.9, there is only a 1% drop in EER compared to the reference system, with at least half the trials taking 8 seconds or less. This compares to the 3.4% drop using a fixed 10 second utterance length. Comparing the mean trial length of just over 20 seconds, there is a 2.1% drop incurred when using a fixed 20 second system.

Also, the lengthier trials indicate that the early decision method is in fact actively determining the quantity of speech data required to be confident in making a verification decision. The algorithm has determined that it has encountered a more difficult situation and has consequently required more speech data to reach a confident decision.

As briefly mentioned above, the techniques for the calculation of a confidence measure may be of value in various forensic tasks, particularly in evaluating the strength of evidence.

Information such as the upper and lower bounds of the verification score on a given verification trial can provide a wealth of information in a forensic scenario to indicate the quality of the evidence. For example, knowing that the odds in favour of an hypothesis are in the range 50:1 to 2:1 provides more information than simply providing 10:1 as the best estimate. Also a range of 50:1 to 2:1 is very different to a range of 12:1 and 9:1 although they may have an equivalent best estimate. Thus the size of the confidence interval on a verification score may be an indicator as to whether the verification score actually gives a legitimate result.

In addition to the above the applicant has realised that further application of the present work to physical systems are possible and this is the focus of their current research. For example the applicant is investigating the possibility of whether the confidence measures discussed can be utilised to turn verification scores into calibrated likelihood ratios. This could be achieved by translating a verification score into a distance from a threshold normalised by the estimated variance, either in terms of cumulative probability density or standard deviations. This may have further applications for score normalisation and fusion tasks as well.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A method for use in speaker recognition for providing an accept or reject verification decision, with a specified confidence level, from a minimal duration of speech, said duration comprising one or more frames, said method including the steps of:
   gathering a speech sample from a speaker for a frame;
   estimating a verification score for said sample;
   determining confidence measures for accept and reject decisions for said verification score at a specified verification threshold wherein the step of determining confidence measures further includes:
   (i). estimating the probability density distribution of the estimated verification score;
   (ii). calculating the confidence of an accept verification decision as the proportion of the estimated probability density that is above the specified verification threshold;
      making an accept decision if the calculated confidence of an accept decision equals or exceeds the specified confidence level and terminating any further gathering of speech;
   (iii). calculating the confidence of a reject verification decision as the proportion of the estimated probability density that is below the specified verification threshold;
      making a reject decision if the calculated confidence of the reject decision is below the specified confidence level and terminating any further gathering of speech; and
   repeating the previous steps for one or more frames until a verification decision has been made, whereby the speech samples for the one or more frames are accumulated to improve the accuracy and/or quality of the estimated probability density distribution of the verification score.

2. The method of claim 1 wherein the speaker verification system utilises fully coupled GMM-UBM modelling using iterative MAP adaptation.

3. The method of claim 2 wherein the verification score is given by the expected log-likelihood ratio, speaker to UBM, wherein the expectation is taken over $$\Lambda_s = \frac{1}{T}\sum_{t=1}^{T} l_s(t) = \frac{1}{T}\sum_{t=1}^{T} \log\left(\frac{p(x_t|\lambda_s)}{p(x_t|\lambda_{ubm})}\right)$$

where $$p(x|\lambda) = \sum_{c=1}^{C} \omega_c g(x|\mu_c, \Sigma_c)$$

and where $\omega_c$ is the mixing factor and $g(x|\mu_c,\Sigma_c)$ denotes the multivariate Gaussian density with mean $\mu_c$ and variance matrix $\Sigma_c$ for mixture component c.

4. The method of claim 3 wherein the probability density distribution is calculated based on the frame log-likelihood ratios $l_S(t)$ having a mean $m_l$ and variance $s_l^2$ wherein the probability density distribution for the verification score has a variance $$\sigma_s^2 = \frac{s_l^2}{T-1}$$

with a mean of $\mu_S = m_l$.

5. The method of claim 1 wherein the probability density distribution is calculated using a transformation approach wherein the verification score given by $$y_s(i) = \frac{1}{N}\sum_{t=N_i}^{N(i+1)-1} l_s(t)$$

where N is the length of the frame sequences, and $l_s(t)$ is the frame log-likelihood ratio.

6. The method of claim 5 wherein the probability density distribution for the verification score has a variance $$\sigma_s^2 = \frac{s_y^2}{T/N - 1}$$

with a mean of $\mu_S = m_y$.

7. The method of claim 1 wherein a priori information is incorporated into the calculation of the probability density distribution wherein said probability density distribution is calculated by $$\hat{s}^2 = \frac{\tau \kappa^2 + (M-1)s^2}{\tau + (M-1)}$$

where $s^2$ is unbiased sample variance from M samples and $\kappa^2$ and $\tau$ are hyperparameters of a prior Dirichlet distribution.

8. The method of claims 1 wherein score normalisation is used in the production of the verification score.

9. The method of claim 8 wherein the score normalisation is the Z-Norm normalisation wherein the normalised verification score is given by the expected log-likelihood ratio, speaker to UBM, is given by:

$$\Lambda_z(s) = \frac{\Lambda(s) - \mu_z(s)}{\sigma_z(s)}$$
$$= a\Lambda(s) + b$$

where $a = 1/\sigma_Z(s)$ and $b = -\mu_Z(s)/\sigma_Z(s)$.

10. The method of claim 8 wherein the score normalisation is the Z-Norm normalisation wherein said Z-Norm normalisation is directly applied to individual frame scores, given by:

$$\Lambda_z(s) = \frac{1}{T}\sum_{t=1}^{T} l'_s(t);$$
$$l'_s(t) = al_s(t) + b.$$

11. The method of claim 10 wherein the probability density distribution has a variance given by:

$$\sigma_{s|z}^2 = a^2 \sigma_s^2$$
$$= \frac{a^2 s_l^2}{T-1}$$

with a mean of $$\mu_{s|z} = a\mu_s + b$$
$$= am_l + b.$$

12. The method of any one of claims 1 to 11 wherein the confidence for determining an accept and/or reject decision is set between a range of 50% to less than 100% confidence.

13. A speaker recognition system operable to provide an accept or reject verification decision, with a specified confidence level, from a minimal duration sample of speech, said duration comprising one or more frames, said system including:
  an input for gathering a speech sample from a speaker for a frame;
  at least one processor wherein said at least one processor is configured to:
    estimate a verification score for said sample;
    determine confidence measures for accept and reject decisions for said verification score at a specified verification threshold wherein determining confidence measures includes:
      (i). estimating the probability density distribution of the estimated verification score;
      (ii). calculating the confidence of an accept verification decision as the proportion of the estimated probability density that is above the specified verification threshold;
        making an accept decision if the calculated confidence of an accept decision equals or exceeds the specified confidence level and terminating any further gathering of speech;
      (iii). calculating the confidence of a reject verification decision as the proportion of the estimated probability density that is below the specified verification threshold;
        making a reject decision if the calculated confidence of an reject decision equals or exceeds the specified confidence level and terminating any further gathering of speech; and
    repeat the previous steps for one or more frames until a verification decision has been made, whereby the speech samples for the one or more frames are accumulated to improve the accuracy and/or quality of the estimated probability density distribution of the verification score.

14. The system of claim 13 wherein the speaker verification system utilises fully coupled GMM-UBM modelling using iterative MAP adaptation.

15. The system of claim 14 wherein the verification score is given by the expected log-likelihood ratio, speaker to UBM, wherein the expectation is taken over $$\Lambda_s = \frac{1}{T}\sum_{t=1}^{T} l_s(t) = \frac{1}{T}\sum_{t=1}^{T} \log\left(\frac{p(x_t | \lambda_s)}{p(x_t | \lambda_{ubm})}\right)$$

where $$p(x|\lambda) = \sum_{c=1}^{C} \omega_c g(x | \mu_c, \Sigma_c)$$

and where $\omega_c$ is the mixing factor and $g(x|\mu_c, \Sigma_c)$ denotes the multivariate Gaussian density with mean $\mu_c$ and variance matrix $\Sigma_c$ for mixture component c.

16. The system of claim 15 wherein the probability density distribution is calculated based on the frame log-likelihood ratios $l_S(t)$ having a mean $m_l$ and variance $s_l^2$ wherein the probability density distribution for the verification score has a variance $$\sigma_s^2 = \frac{s_l^2}{T-1}$$

with a mean of $\mu_S = m_l$.

17. The system of claim 13 wherein the probability density distribution is calculated using a transformation approach wherein the verification score given by $$y_s(i) = \frac{1}{N} \sum_{t=N_i}^{N(i+1)-1} l_s(t)$$

where N is the length of the short frame sequences, and $l_s(t)$ is the frame log-likelihood ratio.

18. The system of claim 17 wherein the probability density distribution for the verification score has a variance $$\sigma_s^2 = \frac{s_y^2}{T/N - 1}$$

with a mean of $\mu_s = m_y$.

19. The system of claim 13 wherein a priori information is incorporated into the calculation of the probability density distribution wherein said probability density distribution is calculated by $$\hat{s}^2 = \frac{\tau \kappa^2 + (M-1)s^2}{\tau + (M-1)}$$

where $s^2$ is unbiased sample variance from M samples and $\kappa^2$ and $\tau$ are hyperparameters of a prior Dirichlet distribution.

20. The system of claims 13 wherein score normalisation is used in the production of the verification score.

21. The system of claim 20 wherein the score normalisation Is the Z-Norm normalisation wherein the normalised verification score is given by the expected log-likelihood ratio, speaker to UBM, given by:

$$\Lambda_z(s) = \frac{\Lambda(s) - \mu_z(s)}{\sigma_z(s)}$$
$$= a\Lambda(s) + b$$

where $a = 1/\sigma_z(s)$ and $b = -\mu_z(s)/\sigma_z(s)$.

22. The system of claim 20 wherein the score normalisation is the Z-Norm normalisation wherein said Z-Norm normalisation is directly applied to individual frame scores, given by:

$$\Lambda_z(s) = \frac{1}{T} \sum_{t=1}^{T} l_s'(t);$$
$$l_s'(t) = al_s(t) + b.$$

23. The system of claim 22 wherein the probability density distribution has a variance given by:

$$\sigma_{s|z}^2 = a^2 \sigma_s^2$$
$$= \frac{a^2 s_l^2}{T-1}$$

with a mean of $$\mu_{s|z} = a\mu_s + b$$
$$= am_l + b.$$

24. The system of any one of claims 13 to 23 wherein the confidence for determining an accept and/or reject decision is set between a range of 50% to less than 100% confidence.

25. A method for use in speaker recognition for providing an accept or reject verification decision, with a predetermined verification threshold, from a minimal duration of speech, said duration comprising one or more frames, said method including the steps of:

gathering a speech sample from a speaker for a frame;
estimating a verification score for said sample;
determining whether the verification score is above or below the verification threshold wherein the step of determining further includes:
(i). determining confidence measures for said verification score, and
(ii). estimating the probability density distribution of the estimated verification score; and
rejecting said speaker and terminating the gathering of speech if the confidence measures indicate with a specified level of confidence that the verification score is below the predetermined verification threshold, or
accepting said speaker and terminating the gathering of speech if the confidence measures indicate with the specified level of confidence that the verification score is above the predetermined verification threshold, otherwise
repeating the previous steps for one or more frames until a verification decision has been made, whereby the speech samples for the one or more frames are accumulated to improve the accuracy and/or quality of the estimated probability density distribution of the verification score.

26. The method of claim 25 wherein the speaker verification system utilises fully coupled GMM-UBM modelling using iterative MAP adaptation.

27. The method of claim 26 wherein the verification score is given by the expected log-likelihood ratio, speaker to UBM, wherein the expectation is taken over $$\Lambda_s = \frac{1}{T} \sum_{t=1}^{T} l_s(t) = \frac{1}{T} \sum_{t=1}^{T} \log\left(\frac{p(x_t | \lambda_s)}{p(x_t | \lambda_{ubm})}\right)$$

where $$p(x | \lambda) = \sum_{c=1}^{C} \omega_c g(x | \mu_c, \Sigma_c)$$

and where $\omega_c$ is the mixing factor and $g(x|\mu_c,\Sigma_c)$ denotes the multivariate Gaussian density with mean $\mu_c$ and variance matrix $\Sigma_c$ for mixture component c.

28. The method of claim 27 wherein the probability density distribution is calculated based on the frame log-likelihood ratios $l_s(t)$ having a mean $m_l$ and variance $s_l^2$ wherein the probability density distribution for the verification score has a variance $$\sigma_s^2 = \frac{s_l^2}{T-1}$$

with a mean of $\mu_s = m_l$.

29. The method of claim 25 wherein the probability density distribution is calculated using a transformation approach wherein the verification score given by $$y_s(i) = \frac{1}{N} \sum_{t=N_i}^{N(i+1)-1} l_s(t)$$

where N is the length of the short frame sequences, and $l_s(t)$ is the frame log-likelihood ratio.

30. The method of claim 29 wherein the probability density distribution for the verification score has a variance $$\sigma_s^2 = \frac{s_y^2}{T/N - 1}$$

with a mean of $\mu_s = m_y$.

31. The method of claim 25 wherein a priori information is incorporated into the calculation of the probability density distribution wherein said probability density distribution is calculated by $$\hat{s}^2 = \frac{\tau\kappa^2 + (M-1)s^2}{\tau + (M-1)}$$

where $s^2$ is unbiased sample variance from M samples and $\kappa^2$ and $\tau$ are hyperparameters of a prior Dirichlet distribution.

32. The method of claim 25 wherein score normalisation is used in the production of the verification score.

33. The method of claim 32 wherein the score normalisation is the Z-Norm normalisation wherein the normalised verification score is given by the expected log-likelihood ratio, speaker to UBM, given by:

$$\Lambda_Z(s) = \frac{\Lambda(s) - \mu_Z(s)}{\sigma_Z(s)}$$
$$= a\Lambda(s) + b$$

where $a = 1/\sigma_Z(s)$ and $b = -\mu_Z(s)/\sigma_Z(s)$.

34. The method of claim 32 wherein the score normalisation is the Z-Norm normalisation wherein said Z-Norm normalisation is directly applied to individual frame scores, given by:

$$\Lambda_Z(s) = \frac{1}{T}\sum_{t=1}^{T} l'_S(t);$$
$$l'_S(t) = al_S(t) + b.$$

35. The method of claim 34 wherein the probability density distribution has a variance given by:

$$\sigma_{S|Z}^2 = a^2 \sigma_S^2$$
$$= \frac{a^2 s_l^2}{T-1}$$

with a mean of $$\mu_{S|Z} = a\mu_S + b$$
$$= am_l + b.$$

36. The method of any one of claims 25 to 35 wherein the confidence for determining an accept and/or reject decision is set between a range of 50% to less than 100% confidence.

37. A speaker recognition system operable to provide an accept or reject verification decision, with a predetermined verification threshold, from a minimal duration of speech, said duration comprising one or more frames, said system including:
an input for gathering a speech sample from a speaker for a frame;
at least one processor wherein said at least one processor is configured to:
estimate a verification score for said sample;
determine whether the verification score is above or below the verification threshold wherein the step of determining further includes:
(i). determining confidence measures for said verification score, and
(ii). estimating the probability density distribution of the estimated verification score;
reject said speaker and terminate the gathering of speech if the confidence measures indicate with a specified specified level of confidence that the verification score is below the predetermined verification threshold, or
accept said speaker and terminate the gathering of speech if the confidence measures indicate with the specified level of confidence that the verification score is above the predetermined verification threshold, otherwise
repeat the previous steps for one or more frames until a verification decision has been made, whereby the speech samples for the one or more frames are accumulated to improve the accuracy and/or quality of the estimated probability density distribution of the verification score.

38. The system of claim 37 wherein the speaker verification system utilises fully coupled GMM-UBM modelling using iterative MAP adaptation.

39. The system of claim 38 wherein the verification score is given by the expected log-likelihood ratio, speaker to UBM, wherein the expectation is taken over $$\Lambda_S = \frac{1}{T}\sum_{t=1}^{T} l_S(t)$$
$$= \frac{1}{T}\sum_{t=1}^{T} \log\left(\frac{p(x_t|\lambda_s)}{p(x_t|\lambda_{ubm})}\right) \text{ where } p(x|\lambda)$$
$$= \sum_{c=1}^{C} \omega_c g(x|\mu_c, \Sigma_c)$$

and where $\omega_c$ is the mixing factor and $g(x|\mu_c, \Sigma_c)$ denotes the multivariate Gaussian density with mean $\mu_c$ and variance matrix $\Sigma_c$ for mixture component c.

40. The system of claim 39 wherein the probability density distribution is calculated based on the frame log-likelihood ratios $l_S(t)$ having a mean $m_l$ and variance $s_l^2$ wherein the probability density distribution for the verification score has a variance $$\sigma_s^2 = \frac{s_l^2}{T-1}$$

with a mean of $\mu_S = m_l$.

41. The system of claim 37 wherein the probability density distribution is calculated using a transformation approach wherein the verification score given by $$y_S(i) = \frac{1}{N}\sum_{t=N_i}^{N(i+1)-1} l_S(t)$$

where N is the length of the short frame sequences, and $l_s(t)$ is the frame log-likelihood ratio.

42. The system of claim 41 wherein the probability density distribution for the verification score has a variance $$\sigma_S^2 = \frac{s_y^2}{T/N - 1}$$

with a mean of $\mu_S = m_l$.

43. The system of claim 37 wherein a priori information is incorporated into the calculation of the probability density distribution wherein said probability density distribution is calculated by $$\hat{s}^2 = \frac{\tau \kappa^2 + (M-1)s^2}{\tau + (M-1)}$$

where $s^2$ is unbiased sample variance from M samples and $\kappa^2$ and $\tau$ are hyperparameters of a prior Dirichlet distribution.

44. The system of claims 37 wherein score normalisation is used in the production of the verification score.

45. The system of claim 44 wherein the score normalisation is the Z-Norm normalisation wherein the normalised verification score is given by the expected log-likelihood ratio, speaker to UBM, given by:

$$\Lambda_Z(s) = \frac{\Lambda(s) - \mu_Z(s)}{\sigma_Z(s)}$$
$$= a\Lambda(s) + b$$

where $a = 1/\sigma_Z(s)$ and $b = \mu_Z(s)/\sigma_Z(s)$.

46. The system of claim 44 wherein the score normalisation is the Z-Norm normalisation wherein said Z-Norm normalisation is directly applied to individual frame scores, given by:

$$\Lambda_Z(s) = \frac{1}{T} \sum_{t=1}^{T} l'_S(t);$$
$$l'_S(t) = a l_S(t) + b.$$

47. The system of claim 46 wherein the probability density distribution has a variance given by:

$$\sigma_{S|Z}^2 = a^2 \sigma_S^2$$
$$= \frac{a^2 s_l^2}{T - 1}$$

with a mean of $$\mu_{S|Z} = a\mu_S + b$$
$$= am_l + b.$$

48. The system of any one of claims 37 to 47 wherein the confidence for determining an accept and/or reject decision is set between a range of 50% to less than 100% confidence.

* * * * *